US012565039B2

(12) United States Patent
Shimakawa

(10) Patent No.: US 12,565,039 B2
(45) Date of Patent: Mar. 3, 2026

(54) PRINTING APPARATUS, METHOD FOR CONTROLLING PRINTING APPARATUS, AND STORAGE MEDIUM

(71) Applicant: CANON KABUSHIKI KAISHA, Tokyo (JP)

(72) Inventor: Masaharu Shimakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 18/529,274

(22) Filed: Dec. 5, 2023

(65) Prior Publication Data

US 2024/0181773 A1 Jun. 6, 2024

(30) Foreign Application Priority Data

Dec. 6, 2022 (JP) ................................ 2022-195013

(51) Int. Cl.

*B41J 2/165* (2006.01)
*B41J 2/045* (2006.01)
*B41J 29/17* (2006.01)

(52) U.S. Cl.

CPC ......... *B41J 2/04561* (2013.01); *B41J 2/0456* (2013.01); *B41J 2/04586* (2013.01); *B41J 2/16532* (2013.01); *B41J 2/16535* (2013.01); *B41J 2/16579* (2013.01); *B41J 29/17* (2013.01); *B41J 2002/16594* (2013.01); *B41P 2235/20* (2013.01); *B41P 2235/27* (2013.01)

(58) Field of Classification Search

CPC ............... B41J 2/16532; B41J 2/16535; B41J 2/16579; B41J 29/17

See application file for complete search history.

(56) References Cited

U.S. PATENT DOCUMENTS

2011/0090284 A1* 4/2011 Ito ....................... B41J 2/14274 347/44
2021/0300030 A1* 9/2021 Kubo .................. B41J 2/16517

FOREIGN PATENT DOCUMENTS

JP 2007-152853 A 6/2007

* cited by examiner

*Primary Examiner* — Sharon Polk
(74) *Attorney, Agent, or Firm* — Venable LLP

(57) ABSTRACT

A printing apparatus includes a detection unit that is arranged to face an ejecting surface on which a plurality of nozzles of a printing head that ejects liquid droplets are arrayed, and detects an ejecting condition of the liquid droplets; a recovery unit that recovers an ejecting condition of nozzles of the printing head; and a control unit that determines whether to perform or skip inspection of the ejecting condition by the detection unit based on a state of each of the nozzles of the printing head, and controls a nozzle for which the inspection of the ejecting condition is determined to be skipped so as to perform the inspection of the ejecting condition by the detection unit after the recovery unit recovers the ejecting condition of the nozzle.

13 Claims, 10 Drawing Sheets

PRINTING APPARATUS, METHOD FOR CONTROLLING PRINTING APPARATUS, AND STORAGE MEDIUM

BACKGROUND OF THE INVENTION

Field of the Invention

The present invention relates to a technology for detecting an ejecting condition of ink droplets ejected from a printing head of a printing apparatus.

Description of the Related Art

In the market of inkjet printing apparatuses that can print large-sized printed matters, applications of output matters are diverse, including CAD line drawings, posters, and art works. For this reason, the printing media suitable for the applications also vary from cost-sensitive to performance-sensitive. Furthermore, the amount of ejected ink and the ejection speed may change depending on various factors such as individual differences in the printing apparatus and the printing head, physical properties for each ink color, use situations, environmental influences, and the like.

In particular, when the ink ejection speed changes, the configuration that enables reciprocal printing of the printing head has a difference occurring between the adhesion position of the ink droplets ejected in the forward direction of the printing head and the adhesion position of the ink droplets ejected in the backward direction of the printing head. As a result, the definition of formed images and the reproducibility of thin lines deteriorate, and the overall image quality deteriorates.

Japanese Patent Laid-Open No. 2007-152853 discloses a registration adjusting method including a measurement unit that measures an ejection speed of ink, and appropriately sets ejection timing from a moving speed and an ejection speed of reciprocal printing based on a measurement result.

If the ejection speed of ink can be accurately measured, a registration adjusting method can be provided.

However, in the inkjet type printing apparatus, in addition to the change in ejection speed, there is a case where the flying state of the ink droplets ejected from the head becomes unstable, and the landing on a paper surface is not accurately performed. The known type has a problem of failing to detect image degradation due to an unstable flying state.

SUMMARY OF THE INVENTION

The present invention has been made in view of the above-described problems, and provides a printing apparatus that can more accurately land ink on a printing medium.

According to a first aspect of the present invention, there is provided a printing apparatus comprising: a detection unit that is arranged to face an ejecting surface on which a plurality of nozzles of a printing head that ejects liquid droplets are arrayed, and detects an ejecting condition of the liquid droplets; a recovery unit that recovers an ejecting condition of nozzles of the printing head; and a control unit that determines whether to perform or skip inspection of the ejecting condition by the detection unit based on a state of each of the nozzles of the printing head, and controls a nozzle for which the inspection of the ejecting condition is determined to be skipped so as to perform the inspection of the ejecting condition by the detection unit after the recovery unit recovers the ejecting condition of the nozzle.

According to a second aspect of the present invention, there is provided a method for controlling a printing apparatus including a detection unit that is arranged to face an ejecting surface on which a plurality of nozzles of a printing head that ejects liquid droplets are arrayed, and detects an ejecting condition of the liquid droplets, and a recovery unit that recovers an ejecting condition of nozzles of the printing head, the method comprising: determining whether to perform or skip inspection of the ejecting condition by the detection unit based on a state of each of the nozzles of the printing head, and controlling a nozzle for which the inspection of the ejecting condition is determined to be skipped so as to perform the inspection of the ejecting condition by the detection unit after the recovery unit recovers the ejecting condition of the nozzle.

Further features of the present invention will become apparent from the following description of exemplary embodiments with reference to the attached drawings.

DESCRIPTION OF THE EMBODIMENTS

Figure 1:
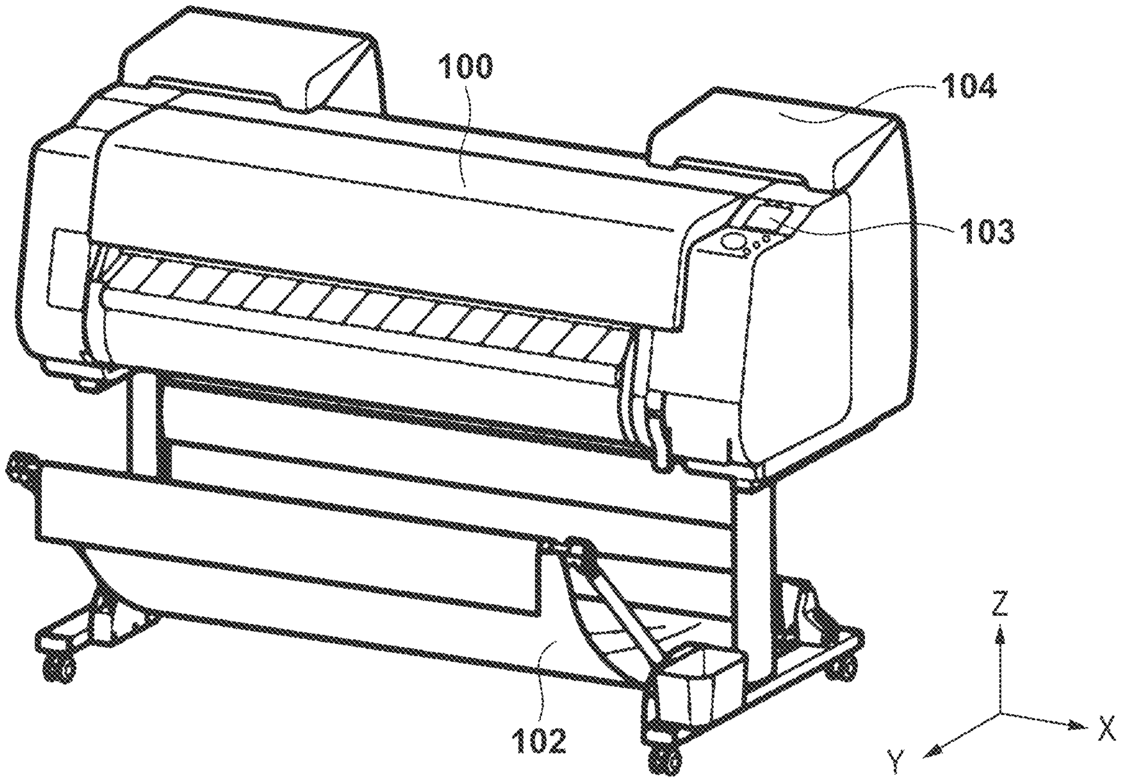
FIG. 1 is a perspective view of an inkjet printing apparatus that is one embodiment of a printing apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Overall Description of Printing Apparatus>

FIG. 1 is a perspective view of an inkjet printing apparatus (hereinafter, printing apparatus) 100, which is one embodiment of the printing apparatus of the present invention, the printing apparatus 100 using a large printing paper (printing medium) such as a size from 10 to 60 inches.

The printing apparatus 100 illustrated in FIG. 1 includes a discharging guide 102 for stacking printing paper having been output, a display panel 103 for displaying various types of printing information, setting results, and the like, an operation panel unit (not illustrated) for setting a printing mode, a printing sheet, and the like. Furthermore, the printing apparatus 100 includes an ink tank unit 104 for accommodating ink tanks of black, cyan, magenta, yellow, and the like and supplying ink to the printing head.

Figure 2:
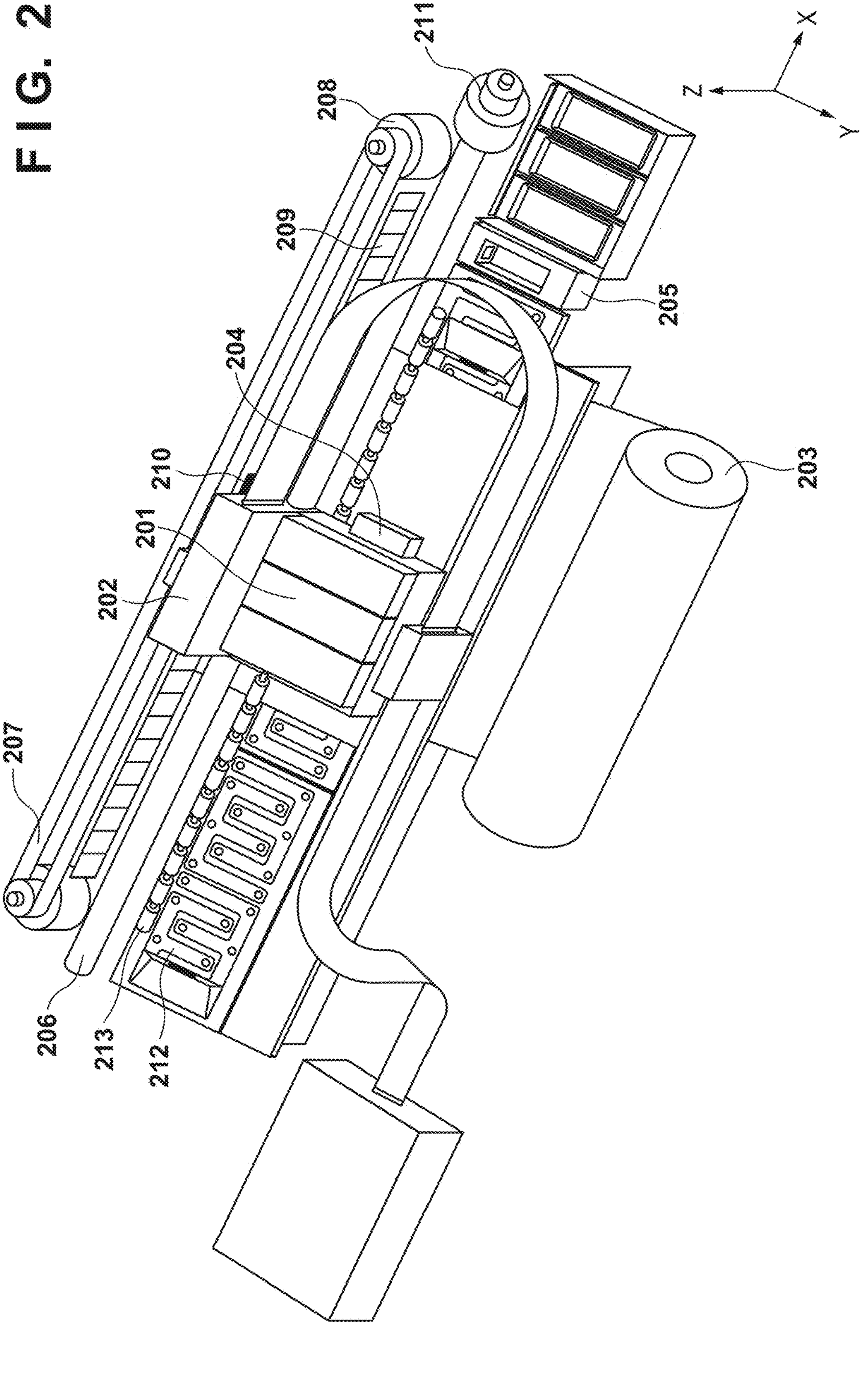
FIG. 2 is a perspective view illustrating an internal configuration of the printing apparatus.

FIG. 2 is a perspective view illustrating the internal configuration of the printing apparatus 100. In FIG. 2, a printing head 201 has an ejecting surface on which a plurality of nozzles for ejecting ink droplets are arrayed, and is mounted on a carriage 202. The printing head 201 includes a distance detection sensor 204 for detecting a distance between printing paper 203 and the printing head 201. Furthermore, the printing apparatus 100 includes an ejection speed detection sensor 205 arranged to face the ejecting surface of the printing head 201, the ejection speed detection sensor 205 for detecting the ejection speed of ink droplets (liquid droplets) ejected from the printing head 201. A main rail 206 supports the carriage 202 and causes the carriage 202 to perform reciprocal scan in the horizontal direction (direction orthogonal to the conveyance direction of the printing paper 203).

The carriage 202 is driven by a carriage motor 208 via a carriage conveyance belt 207. The carriage 202 is caused to perform reciprocal scan in a direction orthogonal to the conveyance direction of the printing paper 203 while acquiring position information by detecting a linear scale 209 provided in a scan direction by an encoder sensor 210 mounted on the carriage 202. Furthermore, by including a lift motor 211 for changing the height of the carriage 202 in stages, it is possible to make the distance between the printing head 201 and the printing paper 203 close to or away from each other. The printing paper 203 is supported by a platen 212 and is conveyed in the conveyance direction by a paper conveyance roller 213. Here, the printing paper 203 will be described with an example of roll paper, but is not limited to this, and for example, cut paper may be used. The width of the printing paper 203 may be configured to correspond to a plurality of paper widths.

Figure 3:
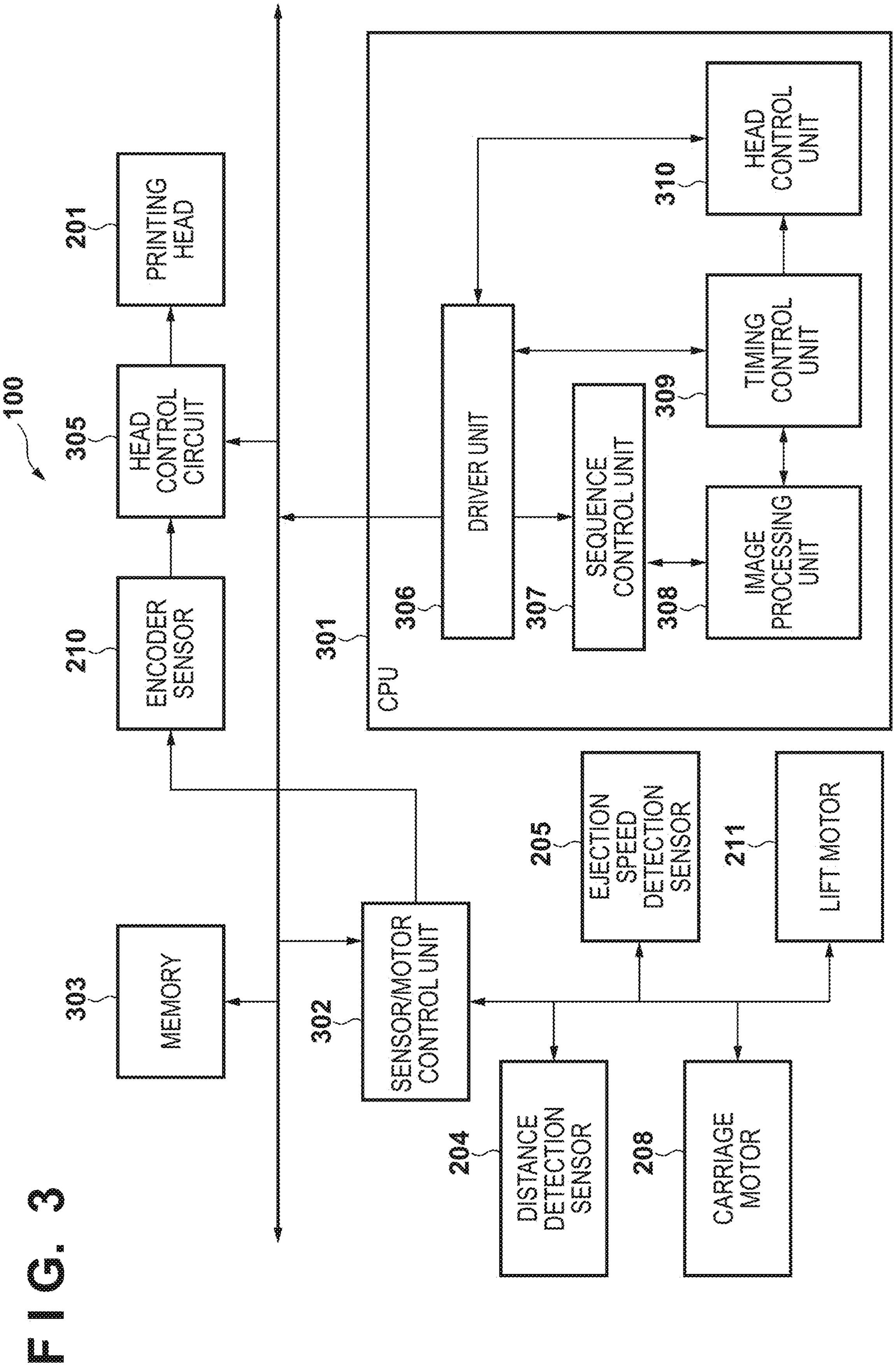
FIG. 3 is a block diagram illustrating a control configuration of the printing apparatus.

FIG. 3 is a view illustrating the internal configuration of the printing apparatus 100. The printing apparatus 100 includes a CPU 301 that controls the entire apparatus, a sensor/motor control unit 302, and a memory 303 that stores various types of information such as an ejection speed and a thickness of printing paper. The CPU 301, the sensor/motor control unit 302, and the memory 303 are communicably connected. The sensor/motor control unit 302 acquires results detected by the distance detection sensor 204 and the ejection speed detection sensor 205. The sensor/motor control unit 302 controls the carriage motor 208 that scans the carriage 202 and the lift motor 211 that changes the height of the carriage 202 in stages. Furthermore, the sensor/motor control unit 302 controls a head control circuit 305 based on the position information detected by the encoder sensor 210. In the above configuration, printing data from a host apparatus (not illustrated) such as a computer is converted into a head control signal, and printing is performed on the printing paper 203 by the printing head 201.

The CPU 301 includes a driver unit 306, a sequence control unit 307, an image processing unit 308, a timing control unit 309, and a head control unit 310. The sequence control unit 307 performs overall printing control, more specifically, start and stop of each functional block, conveyance control of printing paper, scan control of the carriage 202, and the like. Each functional block is implemented, for example, by the CPU 301 reading and executing various programs from the memory 303 or the like.

The driver unit 306 outputs each control signal based on a command from the sequence control unit 307, and transmits an input signal from each unit to the sequence control unit 307. The image processing unit 308 performs image processing of performing color separation/conversion on input image data from the host apparatus. The timing control unit 309 transfers the printing data converted and generated by the image processing unit 308 to the head control unit 310 in conjunction with the position of the carriage 202. The timing control unit 309 also controls ejection timing of the printing data based on the distance between the printing head 201 and the printing paper 203 detected by the distance detection sensor 204. Furthermore, the timing control unit 309 also controls output timing of the printing data based on ejection speed information of each ink droplet ejected from the printing head 201 detected by the ejection speed detection sensor 205. The head control unit 310 converts the printing data input from the timing control unit 309 into a head control signal and outputs the head control signal, and also controls the temperature of the printing head 201 based on a command from the sequence control unit 307.

Figure 4B:
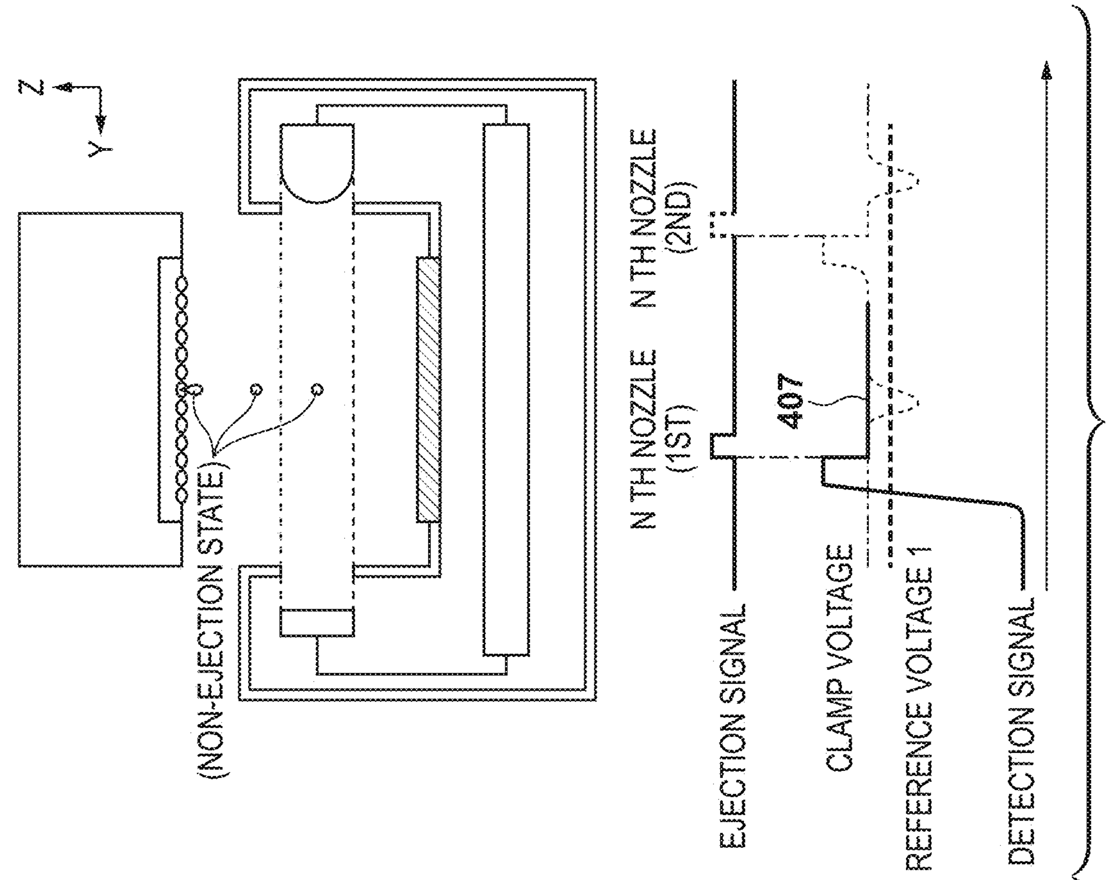
FIGS. 4A and 4B are views for explaining a detection method of an ejecting condition.
Figure 4A:
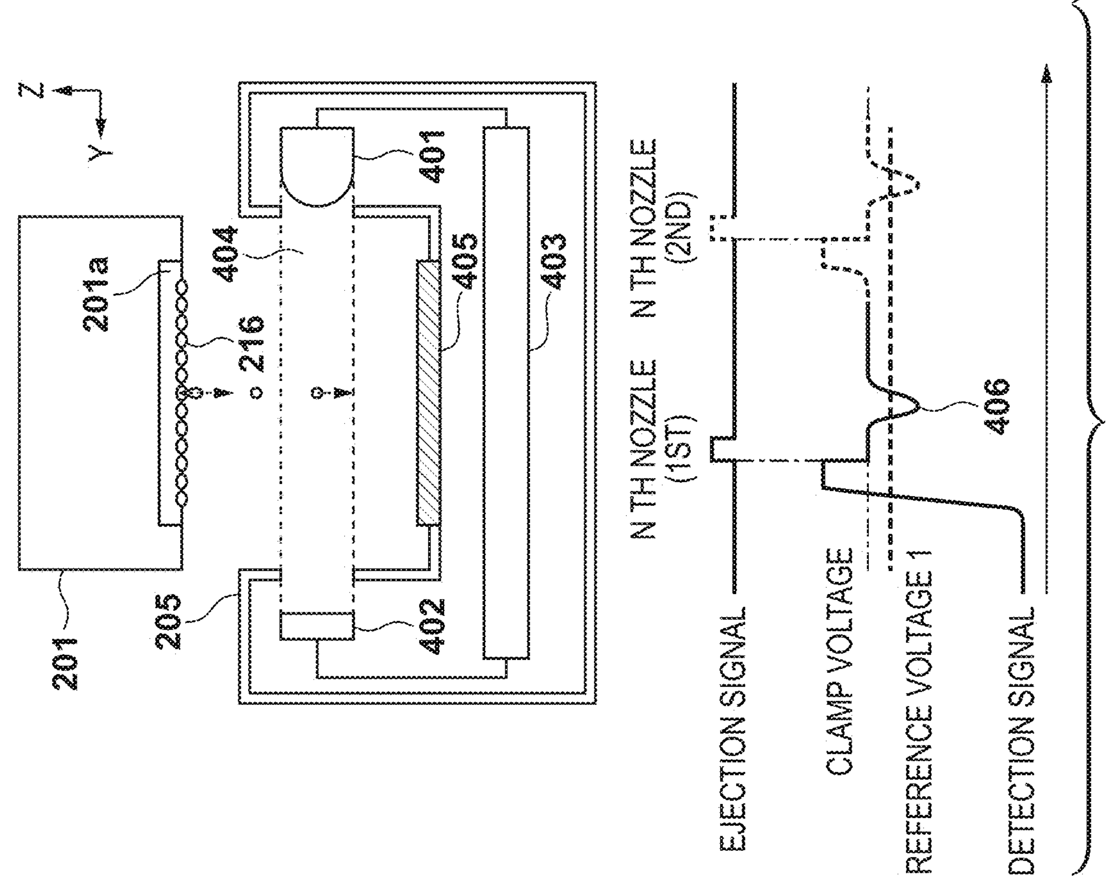

Next, a detection method (inspection method) of an ejecting condition of ink droplets ejected from the printing head 201 in the present embodiment will be described with reference to FIGS. 4A and 4B. FIGS. 4A and 4B are schematic diagrams of the printing head 201 and the ejection speed detection sensor 205 in a state where the printing apparatus 100 is cut along a Y-Z cross section. As illustrated in FIGS. 4A and 4B, for image formation, an ejection orifice (hereinafter, also referred to as nozzle) 216 for ejecting ink droplets for each ink color is provided on an ejection orifice surface 201*a* of the printing head 201.

FIGS. 4A and 4B illustrate timing charts of an ejection signal for applying a drive pulse to the printing head 201 and a signal detected when the ejection speed detection sensor 205 detects passage of an ink droplet ejected from the ejection orifice 216.

The ejection speed detection sensor 205 includes a light-emitting element 401, a light-receiving element 402, and a control circuit board 403. The light-emitting element 401 emits a light flux 404, and the light-receiving element 402 receives the light flux 404 emitted by the light-emitting element 401. The control circuit board 403 detects the amount of the light received by the light-receiving element 402. The control circuit board 403 is provided thereon with a current/voltage conversion circuit that converts a flowing current into a voltage signal, by the amount of light received by the light-receiving element 402, and outputs the voltage signal, and an amplification circuit for the level of the detection signal of ink droplets. Furthermore, in order to remove the influence of saturation of the output and a decrease in S/N due to variation of the detection signal level of ejection of ink droplets due to the influence of disturbance, the control circuit board 403 includes a clamp circuit for holding the level of the signal output from the amplification circuit to a predetermined value (clamp voltage) until immediately before ejection is observed.

These circuits ensure the level of the detection signal for detecting minute changes such as ink droplet ejection. In this configuration, since the amount of light received by the light-receiving element 402 changes when an ink droplet passes through the light flux 404 of the ejection speed detection sensor 205, the ejecting condition of the nozzle that is a detection target can be determined by comparing the level of the output detection signal (output signal) with a predetermined reference voltage.

The ejection speed detection sensor 205 is installed such that the optical axis of the light flux 404 is at the same position in the Z direction as the surface of the platen 212 on the side supporting the printing medium 203. A slit is provided in the vicinity of each of the light-emitting element 401 and the light-receiving element 402 to narrow the incident light flux 404 and improve the S/N ratio. The position of the printing head 201 in the X direction where the ink droplet can be ejected so that the ink droplet passes through the light flux 404 is set as a detectable position.

When the ink droplet is detected in order to detect the ejecting condition of the ink droplet, the sensor/motor control unit 302 controls the carriage motor 208 by a command of the sequence control unit 307 to move the printing head 201 to the detectable position. The cross-sectional area of the light flux 404 in the present embodiment is about 2 mm×2 mm. The parallel light projection area of the ink droplet when the ink droplet passes through the light flux 404 is about $2^{-3}$ ($mm^2$).

An ejection orifice array and the light flux 404 are arranged in parallel to each other, and the creepage distance in the height direction (Z direction) is set to from 2 to 10 mm. When the creepage distance between each ejection orifice and the light flux 404 is made close, the passage of the ink droplet can be detected at a position where the light flux 404 is close to the flying distance of the ejected ink droplet, and thus the ejecting condition can also be stably detected. However, when the ejection orifice array and the light flux 404 are close to each other, a diffuse light component emitted from the light-emitting element 401 is reflected by the ejection orifice surface 201*a* of the printing head 201, and a light amount component received by the light-receiving element 402 is generated. As a result, this light amount component is superimposed on the detection signal as noise with respect to the detection of the ejecting condition, and there is a possibility that good detection can no longer be performed. Therefore, regarding the creepage distance between the light flux 404 of the ejection speed detection sensor 205 and the ejection orifice array of the printing head 201, it is desirable to detect the ejecting condition with more suitable arrangement in consideration of the correlation of them. It is necessary to match the condition for detecting the ejecting condition of the ink droplet by the ejection speed detection sensor 205 with the ejecting condition of the ink droplet onto the printing medium 203 at the time of image formation Therefore, it is desirable that the light flux 404 of the ejection speed detection sensor 205 and the platen 212 supporting the printing medium 203 are arranged at substantially the same height (Z direction).

Next, the configuration for detecting the ejecting condition and non-ejection of ink droplets to be ejected will be described. FIG. 4A illustrates a case where the ejection orifice 216 (N-th nozzle), which is a detection target of the ejecting condition of the printing head 201 by the ejection speed detection sensor 205, has been successfully ejected normally. Ink droplets are ejected toward the ejection speed detection sensor 205 based on ejection signals output from the head control unit 310 and the head control circuit 305 in the CPU 301. The clamp circuit mentioned earlier is operated by a control signal synchronized with ejection of the ink droplets, and the signal level to be output is held at a predetermined clamp voltage value immediately before the ejection of the ink droplets is observed.

Ejection of the ink droplets is started, and the operation by the clamp circuit is released immediately before the ink droplets ejected toward the light flux 404 shield the light flux 404. Thereafter, the detection signal level of the ejection speed detection sensor 205 decreases due to a decrease in the amount of light generated when the ejected ink droplets pass through the light flux 404 of the ejection speed detection sensor 205. The normal ejecting condition is determined by comparing the decrease in the signal level with a reference voltage value defined by the amount of change when the ink droplets shield the light flux 404. As a result, the N-th nozzle that is the detection target is determined to have normally ejected. Here, in order to further increase the reliability of the detection result of the ejecting condition by the ejection speed detection sensor 205, a result of performing the ejection from the N-th nozzle that is the detection target a plurality of times is illustrated.

FIG. 4B illustrates a detection result in a case where the N-th nozzle described in FIG. 4A has not normally ejected, that is, in a non-ejection state. Similarly to FIG. 4A, ink droplets are ejected toward the ejection speed detection sensor 205 based on ejection signals output from the head control unit 310 and the head control circuit 305 in the CPU 301. However, here, the ink droplets cannot be correctly ejected, and the ink droplets do not fly with respect to the light flux 404. As a result, the ink droplets cannot shield the light flux 404, and a decrease in the amount of light generated when ejection is correctly performed cannot be obtained. Therefore, the N-th nozzle that is the detection target is not normally ejected here, and is determined to be in a non-ejection state.

Figure 5A:
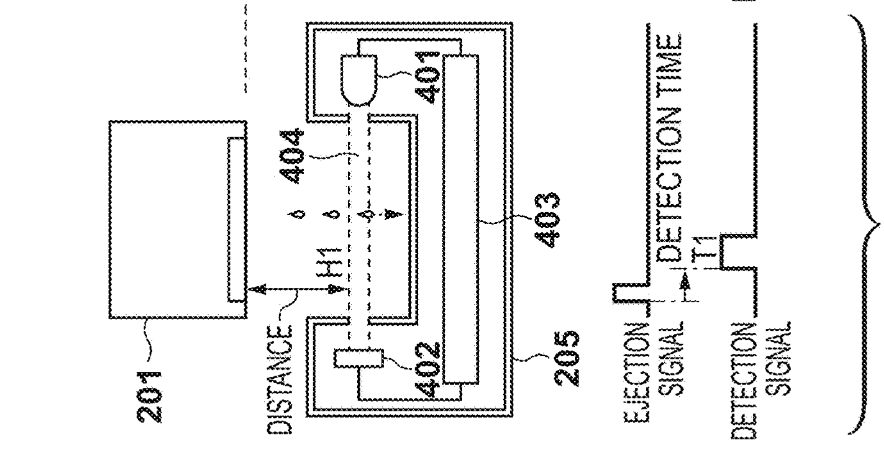
FIGS. 5A to 5D are views for explaining an operation of detecting an ejection speed of ink droplets.

Next, FIG. 5A is a view for explaining the operation of detecting the ejection speed of ink droplets by the ejection speed detection sensor 205. The lift motor 211 is driven to set the distance between the printing head 201 and the ejection speed detection sensor 205 to a first distance H1 and perform detection.

In FIG. 5A, ink droplets are ejected toward the ejection speed detection sensor 205 based on ejection signals output from the head control unit 310 and the head control circuit 305 in the CPU 301. The timing at which the ink droplets pass through the light flux 404 and the light reception amount of the light-receiving element 402 changes is output as a detection signal. Due to this, detection time T1 from when the ejection signal is issued to the printing head 201 to when the detection signal is output is detected. This detection time T1 corresponds to the time during which the ink droplets fly by the distance H1 from the printing head 201 to the ejection speed detection sensor 205.

Figure 5B:
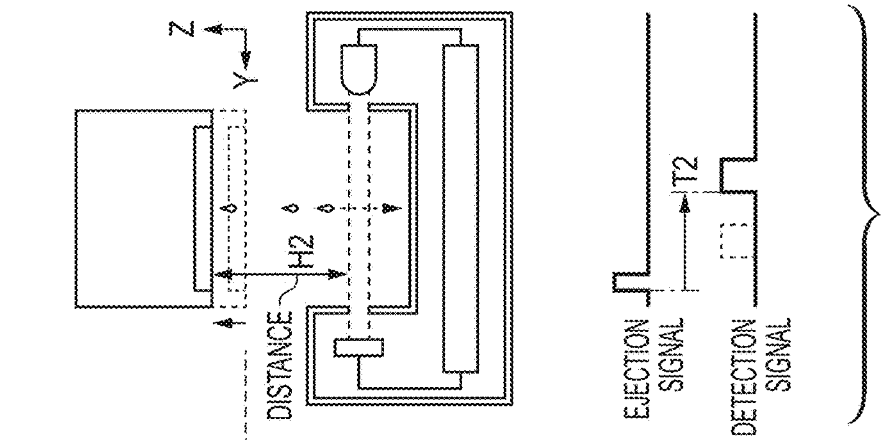

FIG. 5B is a view based on FIG. 5A and illustrating a state in which the lift motor 211 is driven, and the distance between the printing head 201 and the ejection speed detection sensor 205 is further separated to be a second distance H2.

Similarly to the case of FIG. 5A, the timing at which the ink droplets pass through the light flux 404 and the light reception amount of the light-receiving element 402 changes is output as a detection signal. Due to this, detection time T2 from when the ejection signal is issued to the printing head 201 to when the detection signal is output is detected. This detection time T2 corresponds to the time during which the ink droplets fly by the distance H2 from the printing head 201 to the ejection speed detection sensor 205.

From FIGS. 5A and 5B, ejection speed V1 of the ink droplets is calculated as follows based on the distance difference between the first distance H1 and the second distance H2 and the difference between the detection times T1 and T2.

$$V1=(H2-H1)/(T2-T1)$$

Figure 5C:
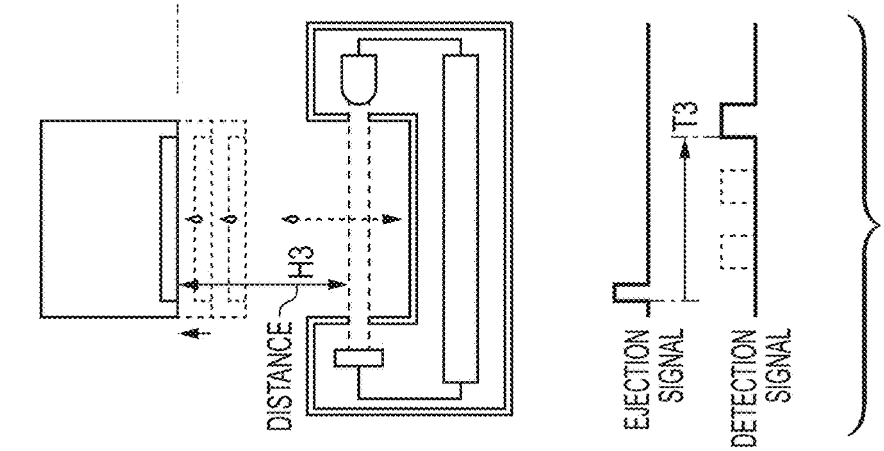

FIG. 5C is a view based on FIG. 5B and illustrating a state in which the lift motor 211 is driven, and the distance between the printing head 201 and the ejection speed detection sensor 205 is further separated to be a third distance H3.

Similarly to the cases of FIGS. 5A and 5B, the timing at which the ink droplets pass through the light flux 404 and the light reception amount of the light-receiving element 402 changes is output as a detection signal. Due to this, detection time T3 from when the ejection signal is issued to the printing head 201 to when the detection signal is output is detected. This detection time T3 corresponds to the time during which the ink droplets fly by the distance H3 from the printing head 201 to the ejection speed detection sensor 205.

From FIGS. 5B and 5C, ejection speed V2 of the ink droplets is calculated as follows based on the distance difference between the second distance H2 and the third distance H3 and the difference between the detection times T2 and T3.

$$V2=(H3-H2)/(T3-T2)$$

Figure 5D:
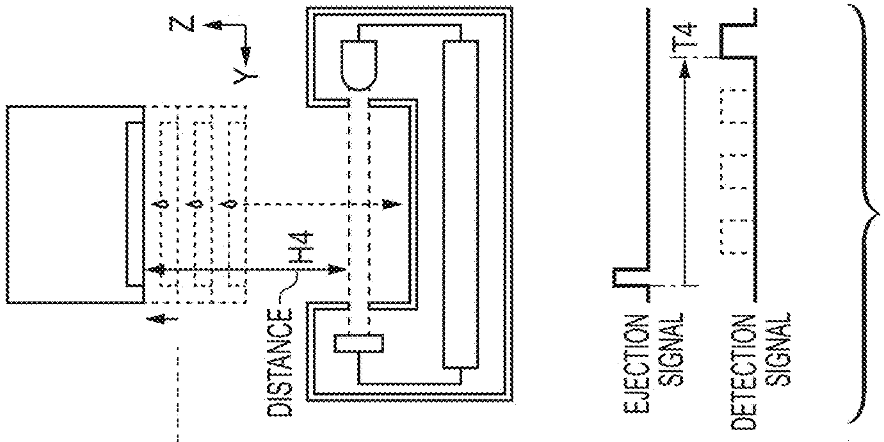

FIG. 5D is a view based on FIG. 5C and illustrating a state in which the lift motor 211 is driven, and the distance between the printing head 201 and the ejection speed detection sensor 205 is further separated to be a fourth distance H4.

Similarly to the cases of FIGS. 5A to 5C, the timing at which the ink droplets pass through the light flux 404 and the light reception amount of the light-receiving element 402 changes is output as a detection signal. Due to this, detection time T4 from when the ejection signal is issued to the printing head 201 to when the detection signal is output is detected. This detection time T4 corresponds to the time during which the ink droplets fly by the distance H4 from the printing head 201 to the ejection speed detection sensor 205.

From FIGS. 5C and 5D, ejection speed V3 of the ink droplets is calculated as follows based on the distance difference between the third distance H3 and the fourth distance H4 and the difference between the detection times T3 and T4.

$$V3=(H4-H3)/(T4-T3)$$

As described above, ejection speed V of the ink droplets corresponding to each distance is calculated based on each distance in which the printing head 201 and the ejection speed detection sensor 205 are separated. The plurality of calculated ejection speeds of the ink droplets are stored as an average value thereof or as a speed corresponding to the distance between the printing head 201 and the printing sheet.

The distance between the printing head 201 and the ejection speed detection sensor 205 can be further separated by the lift motor 211. This makes it possible to measure more separated distances and detection times of the respective ink droplets, and possible to calculate the ejection speed of the ink droplets more accurately. On the other hand, it is possible to reduce the distance in which the printing head 201 and the ejection speed detection sensor 205 are separated by the lift motor 211 and the number of times of changing the distance, and shorten the time required for detection of the ejection speed of ink droplets.

As described above, by providing a lifting and lowering unit for changing the distance from the printing head 201 to the printing paper in a plurality of stages and detecting the ink ejection speed variation in each stage, it becomes possible to detect the ink ejection speed with high accuracy.

Next, monitoring of variation in the ejecting condition of ink droplets will be described. The ejecting condition of ink droplets may change when the ink droplets are ejected from the printing head. On the other hand, since there is no change with ejection of several ink droplets, the ejecting condition may be monitored about once in several pages as a guide. Note that, specifically, by performing the monitoring in a page interval or in a scan interval during printing, it is possible to hardly affect productivity. However, the monitoring performance timing is not limited to this.

Figure 6:
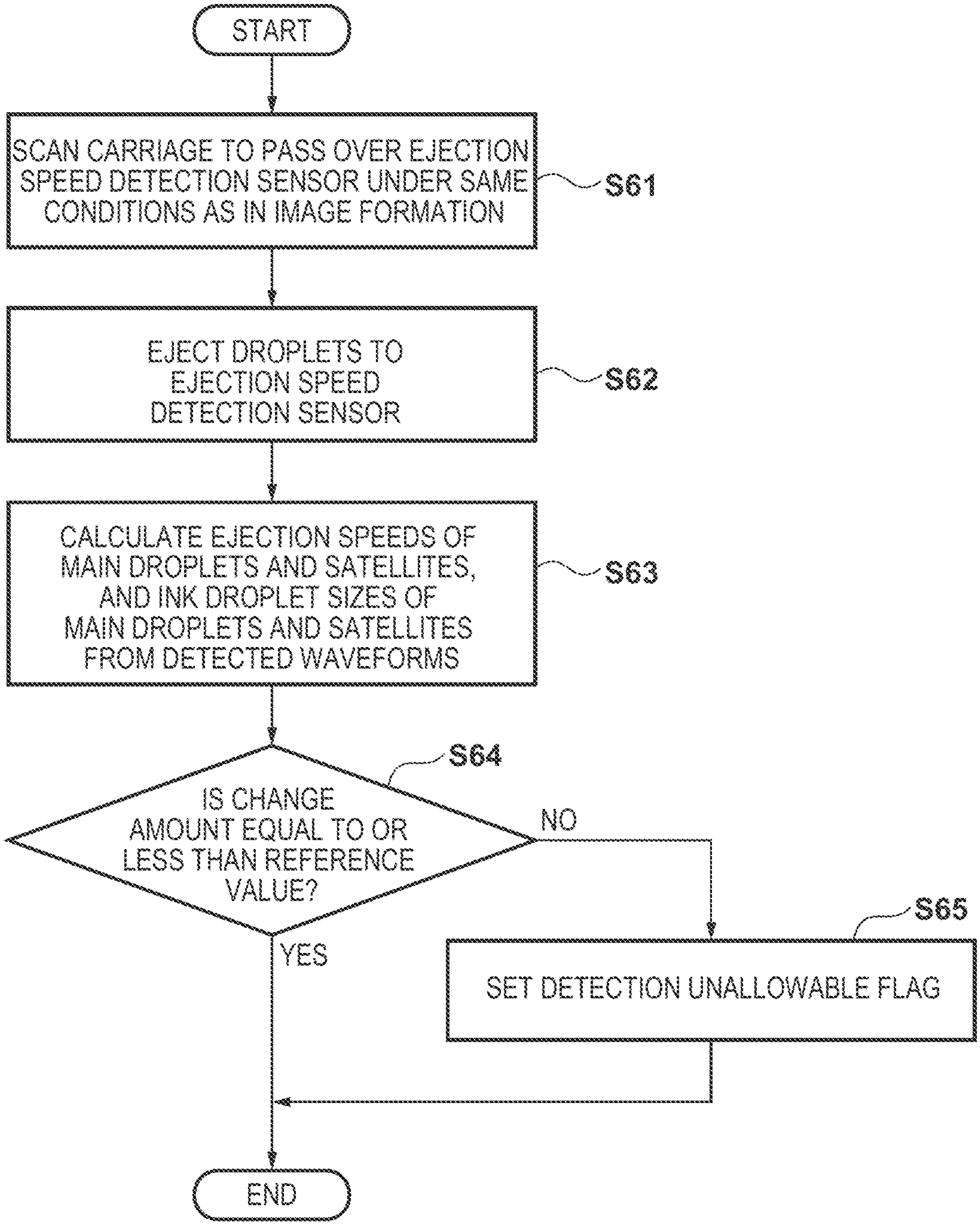
FIG. 6 is a flowchart showing an ejecting condition monitoring sequence.

FIG. 6 is a flowchart showing the operation of monitoring the ejecting condition of ink droplets. The operation of this flowchart is implemented by the CPU 301 executing a program stored in the memory 303 or the like.

First, in step S61, the CPU 301 causes the carriage 202 to scan under the same conditions as in image formation, and causes the carriage to pass over the ejection speed detection sensor 205. The same conditions as in image formation means that the drive of the main body of the printing apparatus 100 and the head drive have the same conditions. The driving of the main body includes a height of the carriage, the driving speed of the carriage, and control. The carriage driving speed includes an acceleration region and a constant speed region. However, most printing is performed in the constant speed region, and therefore it is desirable that ejection monitoring is also performed in the constant speed region. The head drive includes block drive and an ejection pulse width. In order to monitor the change in the landing state of the ejection ink droplets formed on the paper surface, the carriage 202 is driven under the same conditions as the image formation conditions, specifically, under the same conditions as the image formation conditions in terms of the carriage and the paper height and the scanning speed.

Figure 7:
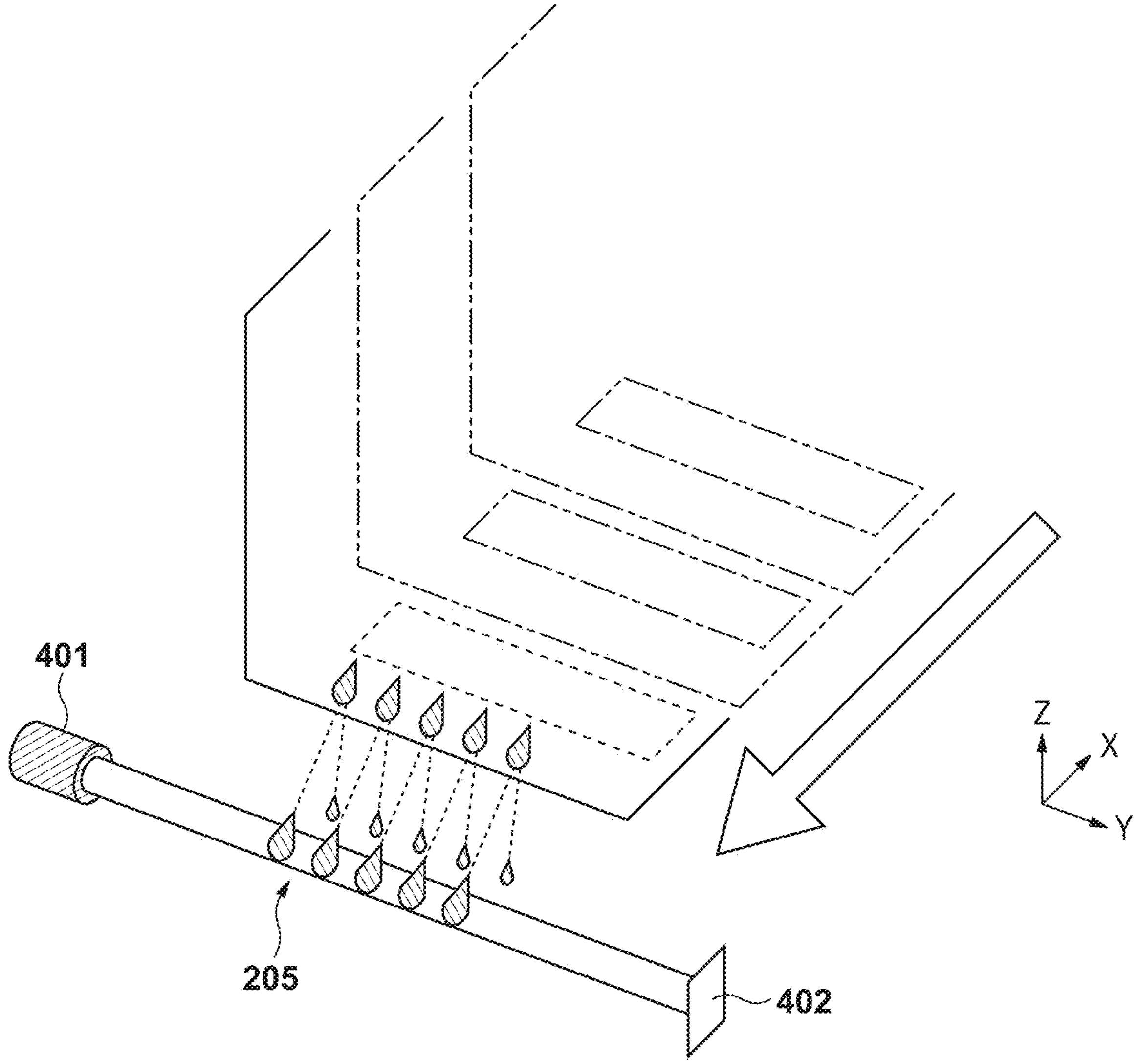
FIG. 7 is a conceptual view illustrating an operation of performing ejection detection while driving a carriage.

FIG. 7 is a view illustrating a concept of monitoring the ejecting condition while driving the carriage 202.

The ink droplets ejected from the printing head 201 are separately ejected into main droplets and small ink droplets (hereinafter referred to as satellites) other than the main droplets depending on the ejection conditions. At the time of ejection, the main droplets and the satellites are ejected from the same position, but the landing position on the paper surface may vary depending on a difference in ejection speed. In order to detect a change in the landing position and the landing dot shape on the paper surface, ejection monitoring is performed under the same conditions as those in image formation. The ejection conditions are preferably identical, but do not necessarily need to be the same in order to detect a change.

Figure 8A:
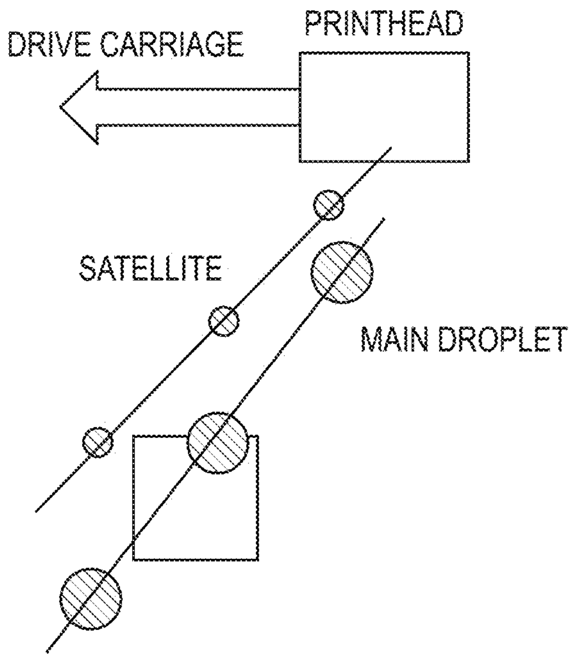
FIGS. 8A and 8B are views for explaining a difference between a drive state of the carriage and a non-drive state of the carriage.
Figure 8B:
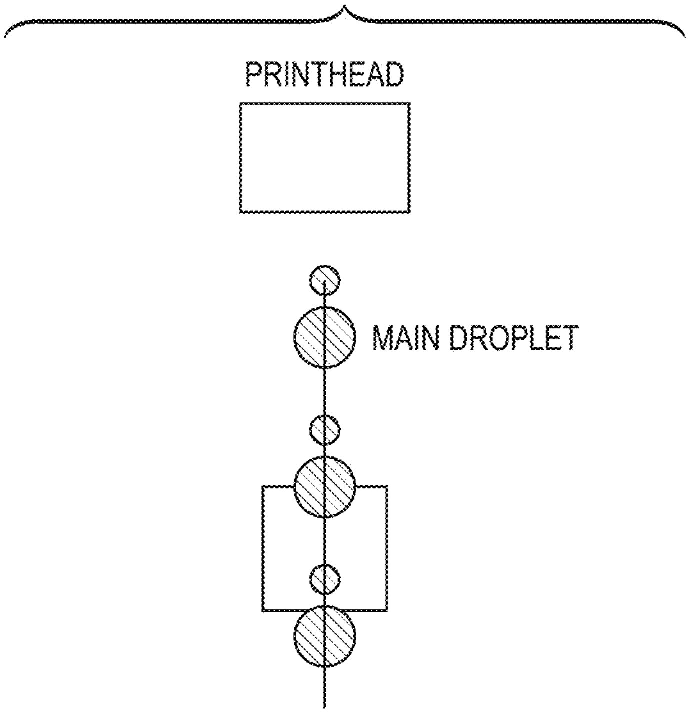

FIGS. 8A and 8B are views for explaining a difference between ejection detection at the time of driving the carriage and ejection detection at the time of not driving the carriage. FIG. 8A illustrates a state of performing ejection detection while driving the carriage 202. FIG. 8B illustrates a state of performing ejection detection while stopping the carriage 202.

The ink droplets ejected from the nozzles are different in ejection size and ejection speed between main droplets and satellites. When performing the ejection detection while driving the carriage 202, it becomes possible to separate and detect the main droplets and the satellites. Therefore, by performing the detection while driving the carriage 202, it is possible to detect a change in the ejection size of the main droplets, a change in the ejection speed, a change in the ejection size of the satellites, and a change in the ejection speed. FIG. 8A illustrates a state in which the main droplets and the satellites are separated and only the main droplets are detected. Only the satellites may be detected by shifting the ejection timing. The main droplets and the satellites may be caused to simultaneously pass through a detection unit while separated depending on the timing of detection by the detection unit.

In step S62, the CPU 301 causes the ink droplets to be ejected so that the ink droplets cross the light flux 404 of the ejection speed detection sensor 205 while causing the carriage 202 to scan under the same conditions as those in image formation.

In step S63, the CPU 301 calculates the ejection speeds of the main droplets and the satellites, and the ink droplet sizes of the main droplets and the satellites from the detection waveforms of the ejection speed detection sensor 205.

Figure 9A:
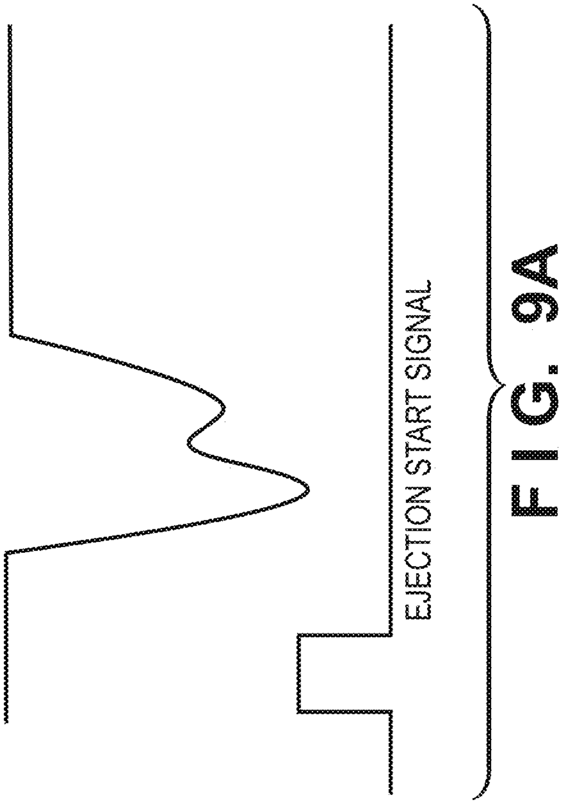
FIGS. 9A to 9D are schematic diagrams for explaining calculation of an ejection speed and an ejection amount.
Figure 9B:

When the ink droplets pass through the ejection speed detection sensor 205, the signal at the time of passing changes as described with reference to FIGS. 4A and 4B. FIGS. 9A to 9D are schematic diagrams illustrating calculation of the ejection speed and the ejection amount. FIG. 9A illustrates a detection signal. The signal that changes when the main droplets and the satellites pass through the ejection speed detection sensor 205 is affected by the distribution of the ejection speed of the ink droplets ejected simultaneously. The change in the ejection speed has a correlation with the ink droplets ejected from the nozzle for printing. Therefore, when a plurality of ink droplets are used for detection, unevenness in the distribution is reduced by selecting nozzles of the same amount of ink. As illustrated in FIG. 9B, function approximation is performed on an assumption that the main droplets and the satellites are normally distributed.

This function approximation is not necessarily performed with a normal distribution, and may be a polynomial approximation. Since the main droplets always have a speed equal to or higher than that of the satellites, the waveform at the head on the time axis of the two normal distribution results is the waveform of the main droplets, and the other is the waveform of the satellites.

Figure 9C:
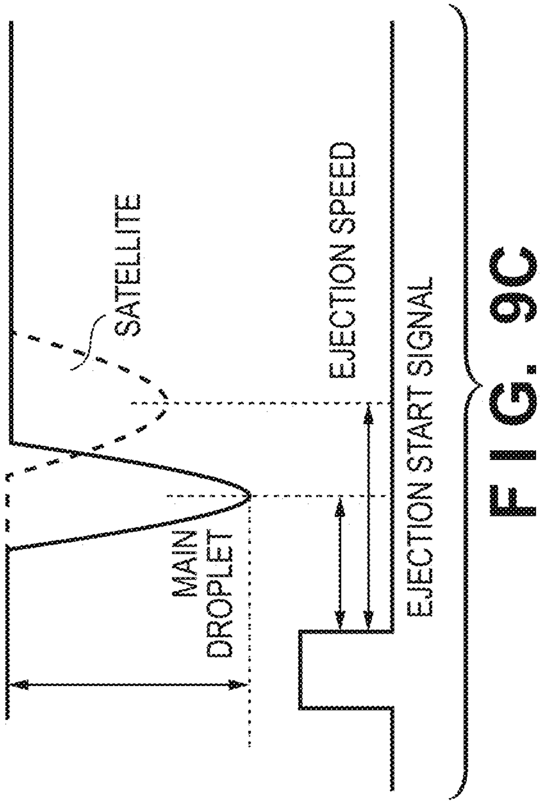

FIG. 9C is a conceptual view of calculating the ejection speed and the ejection amount from separated main droplets. The time since the start of ejection to the detection is calculated. Since the distance between the carriage 202 and the ejection speed detection sensor 205 is known, the ejection speed can be calculated. Since the ejection monitoring is a function of detecting a variation from the initial stage, the accuracy of detecting the absolute value of the distance between the carriage 202 and the ejection speed detection sensor 205 is not necessary. For example, when the initial ejection speed is 18 m/s, it is not necessary to have high detection accuracy of 18 m/s, and it is sufficient that a change of 0.5 m/s can be detected as a change amount after use. The ejection amount is determined from the magnitude of the signal change. This ejection amount can be implemented by obtaining a relationship between the signal change amount and the ejection amount in advance.

Figure 9D:
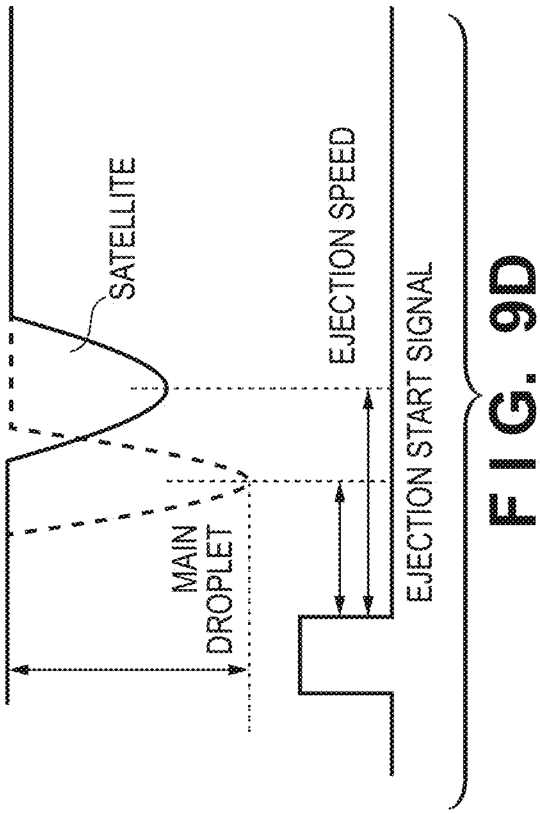

FIG. 9D is a conceptual view in which the ejection speed and the ejection amount are calculated from separated satellites. Similarly to main droplets, the ejection speed and the ejection amount of satellites can be calculated. When the ejection speed changes, the landing position on the paper surface deviates. In this case, for example, when an image is formed with one vertical line, an image defect in which the line becomes thick or one line becomes two lines occurs. Similarly, when the ejection size changes, the image density formed on the paper surface changes. For example, in a case where magenta and cyan are superimposed to form an image, the density balance changes, and an image defect occurs. The CPU 301 calculates the ejection speed and the ink droplet size based on the detection value of the ejection speed detection sensor 205.

In step S64, by comparing an initial or predetermined ejecting condition with the current ejecting condition, the CPU 301 determines whether or not the change amount of the ejection speed and the ejection amount is equal to or less than a reference value.

The ejection monitoring is performed with the time of printer adjustment as a start point, specifically, at the time point when registration adjustment (also referred to as landing position adjustment) or density adjustment (referred to as color calibration) is performed. The ejection speed and the ejection amount when the adjustment is performed are detected and recorded in the memory in the printer. Thereafter, the ejection speed and the ejection amount at the start point are compared at the timing detected as the ejection monitoring. The start point is updated at the timing when the registration adjustment or the density adjustment is performed.

In step S64, each of the ejection speed and the ejection amount of the main droplets or the satellites is compared, and when even any one of them changes by a certain amount or more, there is a possibility that the image quality is affected. A reference value at which an image defect is likely to occur is set in advance. When the change amount of the ejection speed and the ejection amount of the main droplets or the satellites is larger than the reference value, the process proceeds to step S65, a detection unallowable flag is turned on and the ejection speed and the ejection amount are stored in the memory in the printer, and the process ends. When it is determined that the change amount is equal to or less than the reference value, the process ends.

When the detection unallowable flag is on after the process of FIG. 6 ends, adjustment of ejection is notified to the user to urge the adjustment. The main body of the printing apparatus 100 may automatically perform image adjustment. As a means for prompting the adjustment, display on a panel mounted on the printing apparatus 100 is convenient, but the adjustment may be notified to the manager via a network. As the automatic adjustment, registration adjustment or density adjustment mounted on the printing apparatus 100 may be executed. However, the means for automatic adjustment is not limited to the above adjustment. By performing the above ejection monitoring, a state change in ejection can be detected.

Supplementary description will be given regarding the operation of causing the carriage 202 to scan under the same conditions as those of the image formation in step S61 of FIG. 6 and causing the carriage to pass over the ejection speed detection sensor 205.

The ejection speed detection sensor 205 differs from an ink droplet detection sensor that detects non-ejection in terms of the optical system configuration, purpose of implementation, and function, but is preferably used also as the ink droplet detection sensor from the viewpoint of the number of hardware components. Therefore, as one embodiment, the ejection speed detection sensor 205 is used also as the ink droplet detection sensor arranged outside the printing scan region.

On the other hand, the ejection monitoring can be performed during printing operation. In this case, movement to the ink droplet detection sensor arranged outside the printing scan region causes a decrease in the printing throughput. Therefore, a method of using the ejection speed detection sensor 205 also as a preliminary ejection means arranged closest to the printing region may be selected. By arranging the ejection speed detection sensor 205 in a region where the ink passes also at the time of printing, it is possible to perform ejection monitoring without decreasing the print throughput.

Supplementary description will be added regarding the determination of whether or not the change amount is equal to or less than the reference value in step S64 of FIG. 6.

The ejection monitoring is intended to detect a change from a state determined to be correct. Start points determined to be correct include a state of initial installation of the printing apparatus 100. Other start points include a state immediately after the head is replaced and a state after the ejection landing position is adjusted. In each state, the ejecting condition is detected, and this value is stored as a predetermined ejecting condition. When the change amount from this predetermined ejecting condition becomes equal to or greater than a certain value, it is determined to be ejecting condition failure.

Figure 10:
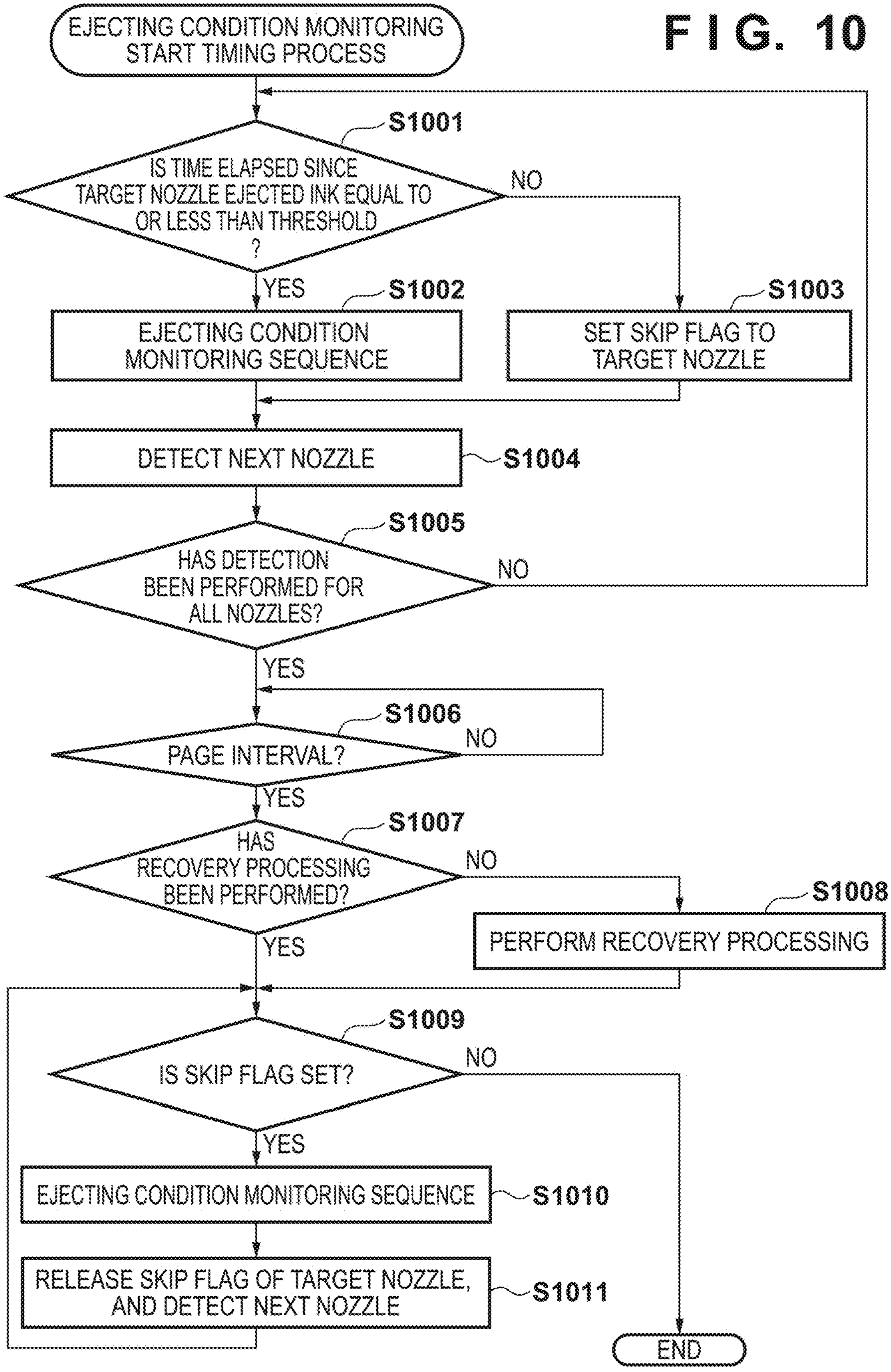
FIG. 10 is a flowchart showing timing at which an ejecting condition is monitored.

Next, a method of monitoring the ejecting condition (flying state) of ink droplets at the timing when each nozzle is brought into a state where the ink droplets can be stably ejected will be described. FIG. 10 is a flowchart showing timing for monitoring the ejecting condition. The operation of this flowchart is implemented by the CPU 301 executing a program stored in the memory 303.

First, in step S1001, the CPU 301 compares the time since the last ejection with a threshold in an ejecting condition monitoring target nozzle for which the ejecting condition monitoring is executed during printing. If a time exceeding the threshold has not elapsed since the last ejection, the ejecting condition monitoring sequence described with reference to FIG. 6 is executed in step S1002. If a time exceeding the threshold has elapsed since the last ejection in step S1001, a skip flag is set for the ejecting condition monitoring target nozzle in step S1003 (ejecting condition is not inspected but skipped). In step S1001, whether or not to perform the ejecting condition monitoring sequence may be determined based on the total number of ink ejections so far in the ejecting condition monitoring target nozzle.

In S1004, the CPU 301 selects the next ejecting condition monitoring target nozzle.

At this time, in a preset ejecting condition monitoring target nozzle, selection may be started from the head nozzle, or the selection may be performed in descending order of the total number of dots of the nozzle. The threshold to be compared with the time since the last ejection is arbitrarily set depending on the state of the ink, the head, and the like. The preset ejecting condition monitoring target nozzles are set for nozzles of an identical color, but it is arbitrarily performed whether to set all nozzles of the identical color or to set some nozzles.

In step S1005, the CPU 301 confirms that the process of all the nozzles has ended, and further confirms that the page interval has come in step S1006. Here, "page interval" indicates a page interval in a print job, but may be timing when printing ends.

In step S1007, the CPU 301 confirms that recovery processing has been performed in a page interval, and if the recovery processing has not been performed, performs the recovery processing in step S1008.

At this time, the recovery processing performs optimum processing for the configuration of the main body of the printing apparatus 100 such as the ink and the head. Specifically, at least one of a wipe operation of wiping the face surface of the head, a preliminary ejection operation of ejecting a prescribed amount of ink from each nozzle, and a suction operation of sucking the ink (liquid) of the head with a pump is performed.

After the recovery processing is performed, the CPU 301 sequentially determines in step S1009 whether a skip flag is set for the ejecting condition monitoring target nozzle. Then, in step S1010, the ejecting condition monitoring sequence described with reference to FIG. 6 is executed for the ejecting condition monitoring target nozzle for which the skip flag is set. In step S1010, the same processing as in step S1002 is performed. The operation at this time may be performed in a page interval, or may be performed during the printing operation of the next page.

In step S1011, the CPU 301 releases the skip flag for the ejecting condition monitoring target nozzle for which the ejecting condition monitoring sequence has been executed, and selects the ejecting condition monitoring target nozzle for which the next skip flag has been set.

In step S1009, the CPU 301 confirms that the skip flags of all the ejecting condition monitoring target nozzles are released, and the process ends.

As described above, in the present embodiment, the ejecting condition (flying state) of ink droplets is detected at the timing when each nozzle is brought into a state where the ink droplets can be stably ejected. This makes it possible to highly accurately detect that the ejection speed and the ejection amount of the ink droplets have varied.

By monitoring the ejecting condition, it is possible to suppress image failure from occurring due to aging or an unintended change in ejection. As a result, it is possible to perform suitable printing with suppressed image failure.

In the ejecting condition detection during printing, the ejecting condition detection is performed in accordance with the state of the nozzle. Specifically, when there is a nozzle that requires the recovery operation, the ejecting condition is monitored after the recovery operation is performed. This enables detection in a state where the ejecting condition is appropriate. As a result, the ejecting condition can be monitored with high accuracy. When there is a nozzle that requires the recovery operation, the ejecting condition detection can be performed collectively after the recovery, and thus the detection time of the ejecting condition detection can be shortened.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195013, filed Dec. 6, 2022, which is hereby incorporated by reference herein in its entirety.

What is claimed is:

1. A printing apparatus comprising:

a detection unit that is arranged to face an ejecting surface on which a plurality of nozzles of a printing head that ejects liquid droplets are arrayed, and detects an ejecting condition of the liquid droplets;

a recovery unit that recovers an ejecting condition of nozzles of the printing head; and a control unit that determines whether to perform or skip inspection of the ejecting condition by the detection unit based on a state of each of the nozzles of the printing head, and controls a nozzle for which the inspection of the ejecting condition is determined to be skipped so as to perform the inspection of the ejecting condition by the detection unit after the recovery unit recovers the ejecting condition of the nozzle.

2. The printing apparatus according to claim 1, wherein the control unit determines to skip inspection of the ejecting condition for a nozzle for which ejection has not been performed after a time exceeding a threshold has elapsed from last ejection of liquid droplets.

3. The printing apparatus according to claim 1, wherein the control unit determines whether to perform or skip the inspection of the ejecting condition based on a total number of liquid droplets ejected from the nozzle.

4. The printing apparatus according to claim 1, wherein the control unit causes the detection unit to detect the ejecting condition of the liquid droplets while causing the detection unit to scan the printing head.

5. The printing apparatus according to claim 1, wherein the detection unit includes a light-emitting unit that emits a light flux in a direction parallel to the ejecting surface, and a light-receiving unit that receives the light flux.

6. The printing apparatus according to claim 5, wherein the detection unit detects an ejecting condition of the liquid droplets based on a change in an output signal of the light-receiving unit when liquid droplets ejected from the nozzle cross the light flux.

7. The printing apparatus according to claim 6, wherein the detection unit detects an ejection amount of the liquid droplets based on a magnitude of the change in the output signal of the light-receiving unit.

8. The printing apparatus according to claim 6, wherein the detection unit detects an ejection speed of the liquid droplets based on timing of a change in an output signal of the light-receiving unit.

9. The printing apparatus according to claim 1, wherein the recovery unit performs at least one of a wipe operation of wiping the ejecting surface of the printing head, a preliminary ejection operation of ejecting a prescribed amount of ink from the nozzle, and a suction operation of sucking liquid from the printing head with a pump.

10. The printing apparatus according to claim 1, wherein the liquid droplets are ink droplets.

11. The printing apparatus according to claim 1, wherein the control unit, in a case where it is determined to perform the inspection of the ejecting condition, performs the inspection of the ejecting condition by the detection unit and thereafter performs the recovery of the ejecting condition of the nozzles by the recovery unit.

12. A method for controlling a printing apparatus including a detection unit that is arranged to face an ejecting surface on which a plurality of nozzles of a printing head that ejects liquid droplets are arrayed, and detects an ejecting condition of the liquid droplets, and a recovery unit that recovers an ejecting condition of nozzles of the printing head, the method comprising:

determining whether to perform or skip inspection of the ejecting condition by the detection unit based on a state of each of the nozzles of the printing head, and controlling a nozzle for which the inspection of the ejecting condition is determined to be skipped so as to perform the inspection of the ejecting condition by the detection unit after the recovery unit recovers the ejecting condition of the nozzle.

13. A non-transitory computer-readable storage medium storing a program for causing a computer to execute a method for controlling a printing apparatus including a detection unit that is arranged to face an ejecting surface on which a plurality of nozzles of a printing head that ejects liquid droplets are arrayed, and detects an ejecting condition of the liquid droplets, and a recovery unit that recovers an ejecting condition of nozzles of the printing head, the method comprising:

determining whether to perform or skip inspection of the ejecting condition by the detection unit based on a state of each of the nozzles of the printing head, and controlling a nozzle for which the inspection of the ejecting condition is determined to be skipped so as to perform the inspection of the ejecting condition by the detection unit after the recovery unit recovers the ejecting condition of the nozzle.

* * * * *